United States Patent [19]

Verbos

[11] Patent Number: 4,509,620
[45] Date of Patent: Apr. 9, 1985

[54] HOIST OR THE LIKE

[75] Inventor: Stephen P. Verbos, Muskegon, Mich.

[73] Assignee: Dresser Industries, Inc., Dallas, Tex.

[21] Appl. No.: 356,009

[22] Filed: Mar. 8, 1982

[51] Int. Cl.³ .................... B60T 13/04; B60L 7/00; F16D 19/00; H01H 51/34
[52] U.S. Cl. .................... 188/171; 188/158; 192/90; 307/132 E; 318/302
[58] Field of Search .............. 188/82.1, 30, 156, 158, 188/163, 171; 254/378; 307/132 E, 141, 10 R; 192/90, 9; 296/63; 318/302

[56] References Cited

U.S. PATENT DOCUMENTS

| 748,762 | 1/1904 | Lorin | 188/82.1 |
| 2,025,098 | 12/1935 | Dudick | 188/171 |
| 2,317,344 | 4/1943 | Hood | 188/171 |
| 3,151,708 | 10/1964 | Trombetta | 188/163 |
| 3,171,515 | 3/1965 | Wolfe | 188/171 |
| 3,180,469 | 4/1965 | Wiedmann et al. | 192/90 |
| 3,614,565 | 10/1971 | Mierendorf | 188/171 |
| 3,761,730 | 9/1973 | Wright | 307/10 R |
| 3,830,344 | 8/1974 | Cervenec et al. | 188/171 |
| 4,114,184 | 9/1978 | Stampfli | 361/154 |
| 4,232,768 | 11/1980 | Dufresne | 188/171 |

Primary Examiner—Bruce H. Stoner, Jr.
Assistant Examiner—Robert Oberleitner
Attorney, Agent, or Firm—Daniel Rubin

[57] ABSTRACT

The improved hoist includes a direct current brake and a control therefor. In the brake control, the AC current is rectified with DC current being sent to the brake solenoid. When the hoist is operating, the brake solenoid is energized to hold the brake in the unactivated position. A timer and power reducer are utilized to reduce the power on the solenoid while the hoist is in operation, thus reducing the energy expended while the hoist is in operation. The operating speed of the brake is increased since less power must be dissipated from the solenoid before the brake can be actuated.

7 Claims, 4 Drawing Figures

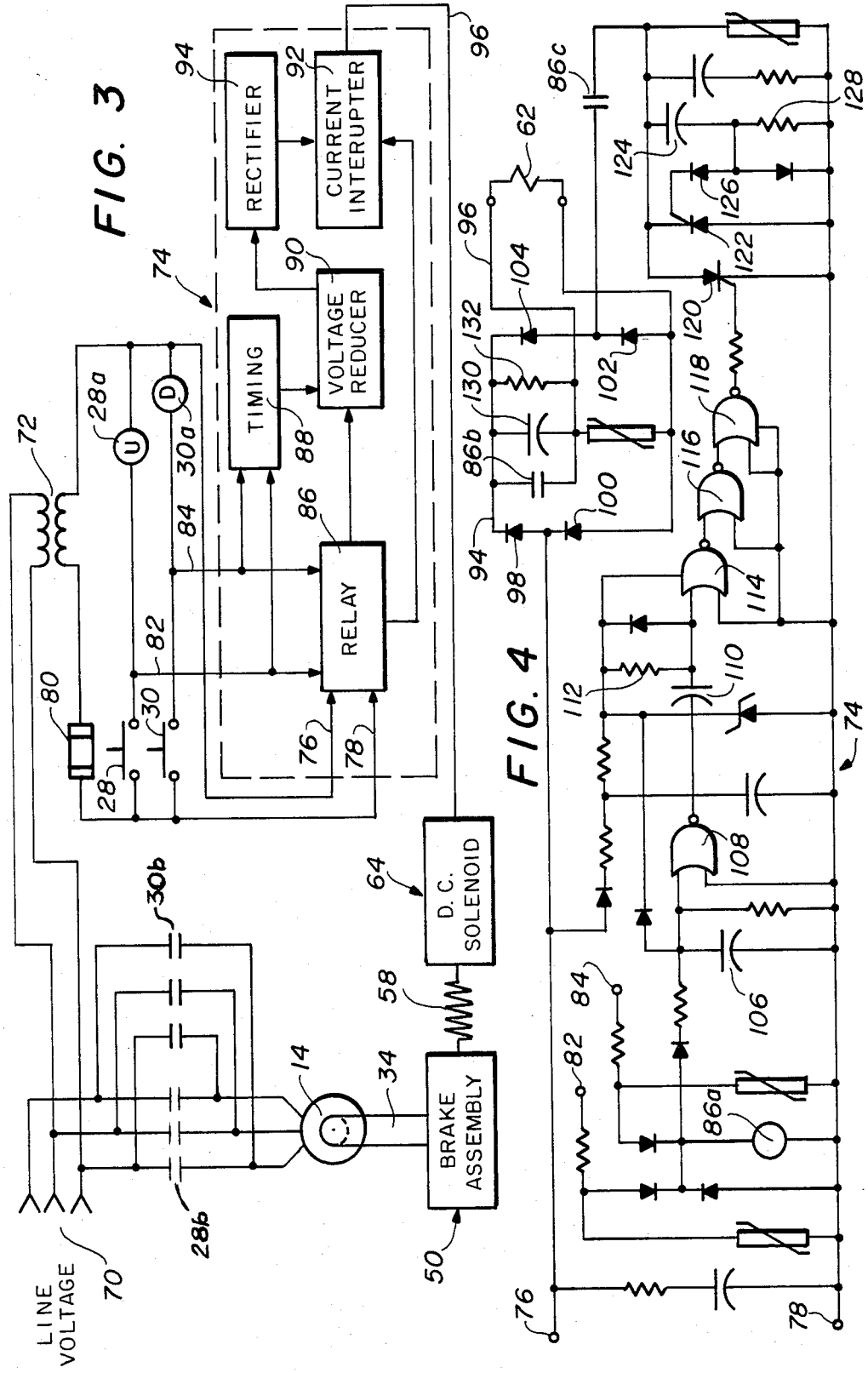

HOIST OR THE LIKE

BACKGROUND OF THE INVENTION

This invention relates generally to an improved hoist. More particularly, but not by way of limitation, this invention relates to an improved hoist having a direct current brake and to the control provided therefore.

Various arrangements of both alternating current and direct current hoist brakes have been utilized with success in the past. It is highly desirable to cause the brakes to actuate as rapidly as possible, and, of course, to utilize as little energy as possible.

U.S. Pat. No. 3,830,344 which issued Aug. 20, 1974 to Cervenec et al. and No. 4,232,768 which issued Nov. 11, 1980 to Jacques Dufresne illustrate brake systems for hoists that are spring actuated and deactivated by means of solenoids. The patents illustrate braking systems for hoists, but do not illustrate the energy saving system of this invention.

Looking at a broader field, that is, the use of solenoids for various other purposes, two patents have been located, namely U.S. Pat. No. 3,761,730 which issued Sept. 25, 1973 to Thomas A. Wright, and U.S. Pat. No. 4,114,184 which issued Sept. 12, 1978 to Harald Stampfli illustrate the use of a reduction in power to maintain the solenoid plunger in position after the large initial moving force has been exerted. In the systems illustrated in the patents, the solenoids are controlled either by a multiple coil or by utilizing a center tap on a single coil. In the foregoing systems, only a portion of the coil or a single coil of two coils is used to retain the plunger in its actuated position. Thus, a reduction in the amount of power utilized is attained compared to applying full power to actuate and retain the solenoid plunger.

It is an object of this invention to provide an improved hoist wherein the brake system is controlled so as to reduce the power required to maintain the brakes in the unactivated position, and thus conserve a substantial amount of energy while at the same time, providing a brake that can be quickly activated.

SUMMARY OF THE INVENTION

This invention then provides an improved hoist comprising a housing; an electric motor located in the housing; a shaft journaled in the housing and driven by the motor; braking means including rotatable friction means on the shaft and stationary friction means on the housing that are arranged to be mutually engageable to prevent rotation of the shaft; solenoid means on housing including biasing means urging the friction means toward engagement, the solenoid means preventing engagement between the friction means when energized and permitting engagement therebetween when deenergized; and control means operably connected with the solenoid means for energizing the solenoid means at a higher power level, and including power reduction means for decreasing the power supply to the solenoid means at a predeterminable time after the solenoid means is energized thereby reducing the power consumption of the solenoid during operation of the hoist.

BRIEF DESCRIPTION OF THE DRAWING

The foregoing and additional objects and advantages of the invention will become more apparent as the following detailed description is read in conjunction with the accompanying drawing, wherein like reference characters denote like parts in all views and wherein:

FIG. 3 is a schematic, logic diagram illustrating a brake control circuit constructed in accordance with the invention.

FIG. 4 is a schematic wiring diagram for the brake control of FIG. 3.

DETAILED DESCRIPTION OF THE PREFERRED EMBODIMENT

Figure 1:
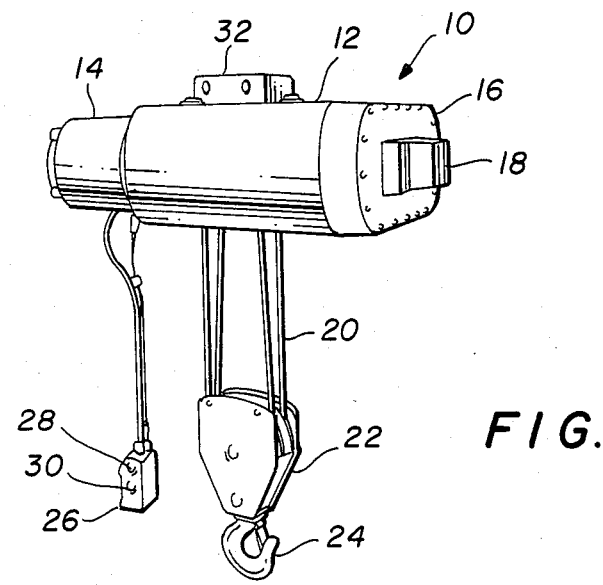
FIG. 1 is a pictorial view of a hoist that is constructed in accordance with the invention.

Referring to the drawing and to FIG. 1 in particular, shown therein and generally designated by the reference character 10, is a hoist that is constructed in accordance with the invention. The hoist 10 includes a housing 12 upon which is mounted a drive motor 14 and an end cap 16 that forms part of the housing 12. A cover 18 is attached to the end cap 16.

Shown as depending from the housing 12, are hoist lines or cables 20 that support a traveling block 22 that has a load hook 24 mounted on the lower end thereof. Also, extending downwardly from the hoist 10 is a pendant control 26 that includes an up switch 28 and a down switch 30 for controlling the position of the block 22 and hook 24 relative to the housing 12.

It should also be mentioned that a bracket 32, which is located on the upper side of the housing 12, is arranged to be attached to some type of supporting arrangement for the hoist 10 that enables the hoist 10 to raise a load on the hook 24.

Figure 2:
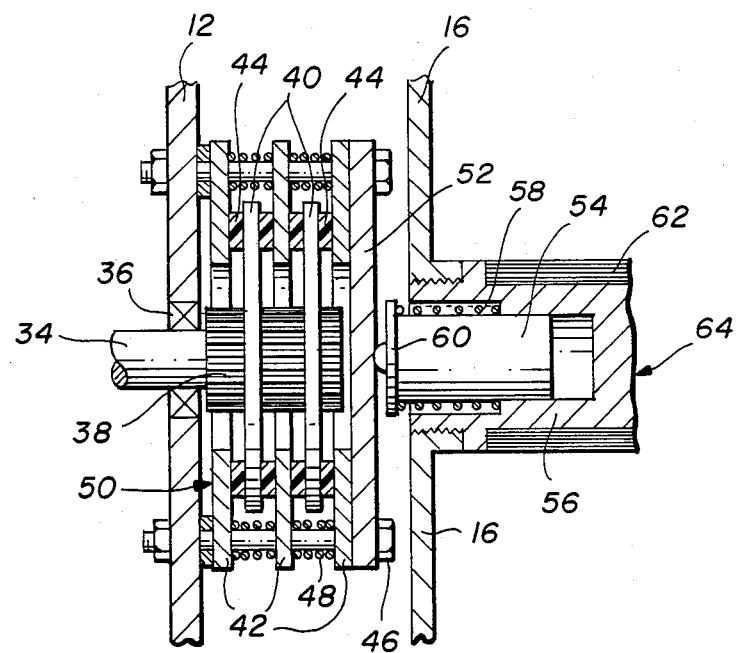
FIG. 2 is an enlarged view of a portion of the hoist of FIG. 1, partially in cross-section and partially in elevation, illustrating a hoist brake apparatus.

Referring now to FIG. 2, a shaft 34, which is rotatable in response to rotation of the motor 14, is journaled by bearings 36 in the housing 12. The shaft 34 includes an enlarged end portion that has a plurality of splines 38 thereon for sliding engagement with splines (not shown) in brake discs 40.

It can be seen that the brake discs 40 are positioned between brake shoes 42, each of which carries one or more brake pads 44 that are in frictional engagement with the discs 40.

The brake discs 40, shoes 42 and brake pads 44 along with the fasteners 46 and springs 48, may be said to comprise a brake assembly that is generally designated by the reference character 50. The fasteners 46 mount the brake assembly 50 on to the housing 12 as well as holding the discs 40 and the shoes 42 in the relative positions illustrated. The springs 48 are compression springs that urge the brake shoes 42 relatively apart, thereby moving the brake pads 44 out of frictional engagement with the brake discs 40 when the brake assembly 50 is in the un-activated position.

Also, carried on the outer or right end of the brake assembly 50, is a brake actuating plate 52 that is in engagement with the end of a solenoid plunger 54. The solenoid plunger 54 is slidably carried in a solenoid body 56 that is threadedly attached to the end cap 16 of the housing 12.

The plunger 54 of the solenoid 56 is biased into engagement with the brake actuating plate 52 by coil compression spring 58 which has one end in engagement with a flange portion 60 on the plunger 54 and the other end in engagement with the solenoid body 56.

The plunger 54 and body 56 along with a solenoid coil, which is illustrated at 62, comprise a solenoid assembly that is generally designated by the reference character 64. When assembled in the hoist 10, the cover 18 conceals the solenoid assembly 64 so that it is not visible in the illustration of FIG. 1. It should also be pointed out that there will, of course, be electrical leads into the solenoid coil 62 and, although not shown in FIG. 2, they will be discussed in connection with FIGS. 3 and 4.

As can be seen in FIG. 3, the hoist 10 is provided with line voltage 70 which provides power to the motor 14. A transformer 72 converts the line voltage to 110 VAC, which is applied constantly to brake control 74 through lines 76 and 78.

110 VAC is also provided to the pendant control 26 (See FIG. 1) that includes the up switch 28 and down switch 30 and coils 28a and 30a. Motor power contacts 28b and 30b are controlled by the switches 28 and 30 through the coils 28a and 30a respectively.

Tapping off the line controlled by the up switch 28 is a conductor 82 that extends to the brake control 74. A conductor 84 taps off the line controlled by the down switch 30 and also extends to the brake control 74.

By way of brief explanation, the brake control 74 operates when either the up switch 28 or the down switch 30 is pressed energizing the relay 86 and timing circuit 88 which cause current to be supplied to a voltage reducer 90, current interruptor 92 and a rectifier 94. Power is also applied to the motor 14 through the appropriate motor power contact 28b or 30b.

The AC current is converted to DC in the rectifier 94 and transmitted to the solenoid 64 by conductor 96. When the timing circuit 88 is actuated, the voltage reducer 90 lowers the initial DC voltage being supplied to the solenoid 64 from about 110 VDC to approximately 10 VDC. The 110 VDC is supplied to the solenoid 64 so that it will have sufficient power to initially release the brake assembly 50 by moving the plunger 54 away from the brake actuating plate 52. Once the solenoid plunger 54 has been retracted, it requires less power to restrain the plunger 54 in the retracted position, thus, it is possible to reduce the power as provided for by the voltage reducer 90 in the brake control 74.

FIG. 4 illustrates the circuit of the brake control 74 in somewhat more in detail. As shown therein, a coil 86a of the relay 86 is energized upon actuating either the up switch 28 or the down switch 30. The coil 86a closes the relay contacts 86b and 86c. With the contacts 86b and 86c closed, it can be seen that the 110 VAC supplied by the conductors 76 and 78 will flow through the rectifier 94, which includes diodes 98, 100, 102 and 104. The 110 VAC is rectified to 110 VDC, and transmitted by a conductor 96 to the coil 62 of the solenoid 64.

Simultaneously, the timing circuit 88 begins to function, voltage is applied to capacitor 106, the output of gate 108 goes to zero, and capacitor 110 begins to build up through resistance 112. When the charge on capacitor 110 reaches approximately 6 V, the gates 114, 116 and 118 change state causing SCR 120 to shut off. When the SCR 120 shuts off, current flow is to SCR 122, that is, through the voltage reducer 90. Flow through SCR 122 can occur only when the SCR 122 is actuated via capacitor 124 and diode 126. The rate charge on the capacitor 124 is controlled by the resistor 128, so that the output of the SCR 122 is intermitent and has a value of about 10 VDC instead of the 110 VAC applied thereto. This then flows through the rectifier 94 to the coil 62 of the solenoid 64. Thus, the initial power supplied to the DC solenoid 64 was at 110 VDC and then subsequently reduced through the action of the timing circuit 88 to 10 VDC to maintain the plunger 54 in the solenoid 64 in the retracted position.

When the up or down buttons 28 or 30 are released, the coil 86a is de-energized, opening the contacts 86b and 86c, which shut off power to the solenoid coil 62. Since a substantial amount of power is stored in the solenoid coil 62 even at the reduced voltage, damage to the contact 86b could occur as the energy is dissipated. To avoid this, a portion of the power is absorbed in the current interruptor 92 by building up a charge in a capacitor 130 and a portion is dissipated as heat in the resistor 132. Thus, not all of the energy is applied to the contact 86b when they are broken and thus arcing and damage to the contact is avoided. Upon breaking of the circuit, the timing circuit 88 automatically resets for the next cycle.

When the hoist 10 is to be placed in operation, either the up switch 28 or the down switch 30 is depressed, which, through the brake control 74, supplies the initial 110 VDC to the solenoid coil 62 of the DC solenoid 64, causing the plunger 54 to retract quickly. The quick movement of the solenoid plunger 54 relatively away from the brake 50, permits the springs 48 to force the brake shoes 42 relatively apart and move the brake pads 44 mounted thereon away from the brake discs 40, permitting motor 14 to cause the shaft 34 to rotate.

The brake assembly 50 and motor 14 are controlled by the switches 28 and 30. The brake assembly 50 operates very quickly through the described circuit so the brake shoes 42 move away from the discs 40 avoiding or, at least, substantially reducing wear as the motor 14 attempts to drive shaft 34. Rotation of the shaft 34 moves the hook 24 in the desired direction.

The 110 VDC is applied to the solenoid 64 until such time as the timing circuit 88 actuates dropping the voltage to the solenoid 64 to 10 VDC as previously described. The voltage will remain at this level until the up or down switch is released.

When this occurs, the spring 58 in the solenoid 64 automatically returns the plunger 54 to its initial position forcing the brake actuating plate 52 to compress the springs 48 and move the brake pads 44 again into frictional engagement with the brake disc 40 carried by the shaft 34. The shaft 34 is prevented from rotating locking the hook 24 at whatever position it is in when the brake is released.

It will of course be appreciated that it is important that the brake actuate immediately upon release of the up or down switch so that the load does not move. As previously discussed, the reduction in the voltage in the coil 62 also provides for the reduction of energy stored therein, thus making it possible to release the solenoid plunger 54 much more rapidly than would be the case if the full 110 VDC were applied to the coil 62 throughout the operation of the hoist 10.

From the foregoing, it will be seen that there is provided an improved hoist that includes a brake control system that will result in a substantial saving of energy due to the reduction of the power supply to the brake solenoid after the initial release of the brake. Also, it will be clear that the circuit interruptor described in the foregoing system provides for a greater life of the contacts during the use of the hoist since damage during frequent opening and closing is avoided.

It will also be understood that the foregoing detailed description is provided by way of example only and that many changes and modifications can be made thereto without departing from the spirit or scope of the invention.

The embodiments of the invention in which an exclusive property or privilege is claimed are defined as follows:

1. An improved hoist comprising in combination:
    a housing;
    an electrically powered motor located in the housing;
    a shaft journaled in the housing and driven by the motor;
    braking means including rotatable friction means on the shaft and stationary friction means on the housing that are arranged to be mutually engageable to prevent rotation of the shaft;
    solenoid means on said housing including biasing means urging said friction means toward engagement, said solenoid means being operative to enable disengagement between said friction means when energized and permitting engagement therebetween when deenergized;
    electrical switch means operable in a portion of the electrical circuit remote from the power input to said motor and at a reduced voltage as compared to said motor input, said switch means being connected to contacts operable when actuated to energize and deenergize said motor; and
    electrical control means energized and deenergized by said switch means in a parallel circuit relation with the contacts for said motor, said control means being connected with said solenoid means for energizing said solenoid means at a high power level and including power reduction means for decreasing the power supplied to said solenoid means at a predeterminable time after said solenoid means is energized thereby reducing the power consumption of said solenoid during operation of the hoist.

2. The hoist of claim 1, wherein:
    said solenoid means includes a hollow body attached to said housing and a plunger that is located for reciprocating movement in said body; and,
    said biasing means engages said body and said plunger to urge said plunger toward said stationary friction means, whereby said friction means are urged toward mutual engagement.

3. The hoist of claim 2 wherein said biasing means comprises a compression spring encircling said plunger.

4. The hoist of claim 1, wherein said control means also comprises power dissipation means electrically connected in series with said solenoid means;
    said power dissipation means including a resistance, a capacitance, and an on/off contactor located in parallel with respect to each other for rapidly dissipating the energy in said solenoid means and thereby providing for the rapid engagement of said friction means, and avoiding electrical arc damage to said contactor.

5. The hoist of claims 1 or 4 wherein said control means also includes timing means actuated upon energizing of said solenoid means for signaling said power reduction means to reduce the voltage to said solenoid means after a pre-determined time lapse.

6. The hoist of claim 5 wherein said power reduction means comprises a voltage control circuit adapted to permit full voltage to said solenoid means in one operating condition and a reduced voltage to said solenoid means in a reduced power operating condition.

7. The hoist of claim 6 wherein said voltage control circuit includes:
    a first SCR controlled by said timing means;
    a second SCR in parallel with said first SCR;
    a capacitance and resistance in series with each other and in parallel with said SCR's; and,
    means connecting said second SCR and capacitance whereby the discharge of said capacitance when said first SCR is "off" causes said second SCR to reduce the voltage to said solenoid means.

* * * * *